Patented Apr. 7, 1953

2,634,212

UNITED STATES PATENT OFFICE 2,634,212

MANUFACTURE OF CONDITIONING COMPOUND FOR GROUND MEAT PRODUCTS

Stephan L. Komarik, Chicago, Ill., assignor to The Griffith Laboratories, Inc., Chicago, Ill., a corporation of Illinois No Drawing. Application May 4, 1951, Serial No. 224,668

20 Claims. (Cl. 99—140)

The present invention relates generally to the preparation of ground meat products, and in particular to a prepared conditioner therefor.

Heretofore, prepared meat products such as encased meats, meat loaves, canned luncheon meats, and the like have been made from homogeneous mixtures comprising primarily ground meat, curing agents, flavoring materials, and water-binding agents, which latter commonly function additionally as emulsifiers for fat to give smoothness to the product. The water-binding agents function primarily to store water in the composition in a form not readily lost by evaporation. This is particularly important in encased meat products to minimize shrinkage which may result from drying. Because of the several functions exercised by the water-binding agents, they are generally referred to herein as conditioners. Conditioners are commonly selected from the cereals such as corn starch, wheat flour, soya meal, the gums, such as karaya, tragacanth and locust bean, and other classes, such as milk solids, agar agar, algin and alginate salts. These are all hydrophilic colloids and in general they serve also as emulsifiers of fat to give smoothness to the product. However, as colloids they tend to gel as temperatures are lowered and concentrations increased, and to liquify as temperatures rise, with variation in their desired properties.

Most of the cooked meat products carrying colloid conditioners must be heated to at least 160° F. in cooking or smoking. This is true of loaf, some encased products and canned products. The heating denatures the colloids to a degree evidenced by decrease in water-binding power and by release of water during heating. This gives a soft watery product and when there is a following loss of the released water by evaporation there is shrinkage. Also, as such products age, the colloid conditioners in their gel form also age and in aging lose water-binding power which is manifested by shrinkage, accompanied by loss of water by evaporation or purging of water into the container.

The present invention is based upon the discovery that certain hydrolysates of starch have water-binding power as meat conditioners; that they are not sensitive to heat, and hence more stable; and that they are more stable over long periods of time with respect to water-binding function in meat products. Additionally, they give improved color to the meat and provide an antioxidant with respect to hemoglobin color.

Although the invention broadly contemplates any starch as a source of the hydrolysate, the invention is explained with particular reference to derivatives from corn starch, since these are by far the leading commercial materials. The corn refining industry has a well developed art of hydrolysing corn starch to convert the starch to dextrose. The hydrolysis is carried out by use of acid alone, or by use of acid for the initial stages followed by enzyme hydrolysis in the final stages (see U. S. Patent No. 2,201,609). However, the conversion reaction may be arrested long before its completion to yield intermediate hydrolysates containing from small to large amounts of dextrose and other reducing sugars as well as from large to small amounts of intermediate products in the chemical path from starch to dextrose. Intermediate products are maltose, higher sugars, and dextrins, all of which eventually hydrolyse to dextrose. The character of the product as a hydrolysate is expressed by a "D. E." number which is the ratio of "dextrose equivalent," or in other words of reducing sugars, to the total dry substance of the hydrolysate (see Fetzer U. S. No. 2,210,659). Corn sugar is dextrose. Corn syrup of commerce is an incomplete hydrolysate, and contains dextrose, maltose, higher sugars and dextrins. Relative to colloidal starch, the ingredients of corn syrup are non-colloidal compounds of small molecular size. Commercial corn syrups are of such character that they may be dried to a powder, well known in commerce as "dry syrup." The powder is noticeably hygroscopic and substantially non-sweet. As the D. E. increases to 55 the fluidity of the liquid syrup and the hygroscopicity of the "dry-syrup" increase to the detriment of the water-binding power. Above D. E. of 55 the sweetness and a bitterness due to hydrol increase to a point making it objectionable in the quantities needed for use as a meat conditioner (see Brock et al. No. 2,410,264). When the D. E. is below 24, the hydrolysate reacts with iodine more like a cereal or starch giving a dark stain making it objectionable in certain fields as a meat conditioner; and, it functions more like a starch because of the greater molecular sizes of the ingredients. At D. E. of 24 there is commonly not over ½% starch in the solids, and frequently no starch content. At D. E. of 30 no starch is present. In the range from D. E. 24 to 30, starch may be present or not depending upon many factors in the conduct of the hydrolysis.

For the present invention the hydrolysates of starch herein contemplated are those having a D. E. in the range from 24 to 55, and preferably a D. E. in the range from 30 to 42. These are substantially non-sweet, are water-soluble as crystalloids rather than as colloids, and are subject to drying to powder form. The powder form is a convenient form for marketing and using such hydrolysate. However, it offers difficulties.

Dry syrup is conventionally marketed in special bags, and as initially prepared and so packaged, it is dusty. However, it is hygroscopic due to the dextrose content, so that on exposure from opening a bag, its character changes from dustiness to lumpiness and caking as time elapses, and the more so the higher the humidity.

The present invention has for its general object the preparation of a conditioner compound consisting essentially of such dry syrup and associated agents which produce a homogeneous stable compound of uniform granular consistency and character over long periods of time.

It is a particular object to compound dry syrup with other materials normally associated with it in compounding meat products.

It is a particular object to provide a dry syrup compound having an edible oleaginous non-caking agent.

It is another object to provide an edible oleaginous non-caking agent combined with antioxidant material for fats and oils.

It is a particular object to provide edible oleaginous non-caking agent with lecithin as antioxidant which acts also to supplement the fat-emulsifying power of the dry syrup in compounding sausage, loaf and like ground meat products.

Various other and ancillary objects and advantages of the invention will become apparent from the following description and explanation of the invention.

The present invention is not directed to the use of dextrose, although it involves and takes advantage of certain known functions of dextrose. Merely because dextrose is one product of a starch hydrolysis, of which the other ingredients are of primary interest in the present invention, the upper limit in the range of D. E. for the hydrolysates is limited in part because of the dextrose.

In the U. S. Patent No. 2,147,261 Lewis describes the fixation, stabilization and restoration of desirable color in meat and in nitrite cured meat, by the use of reducing sugars, in particular dextrose. As reducing sugars Lewis describes "starch conversion syrups and sugars (such, for example, as dextrose), maltose, levulose, lactose and invert sugar." Relatively small amounts of reducing sugars are used by Lewis for the function of chemical reduction of compounds involving hemoglobin, and the treatments are directed primarily to exposed surfaces of the meat where color changes, rather than to the mass properties of the meat and the water content.

In the meat-packing industry use of large amounts of dextrose is generally undesirable on account of excess of sweetness imparted to the meat product. The present invention uses much larger amounts of material limited in content of dextrose and other sweet ingredients, yet containing non-sweet reducing sugars as well as functioning ingredients which are not reducing sugars. By employing a hydrolysate of starch incompletely carried to its maximum dextrose content, there are provided water-soluble materials of greater-molecular size than dextrose including materials which are reducing sugars of substantially non-sweet character. In consequence the present invention provides all of the advantages as to hemoglobin color which are obtainable with small quantities of dextrose, and numerous additional advantages which are not possible with like amounts of dextrose. The material of the present invention is used for its physical functioning as well as its chemical functioning, thus to include all the advantages of the use of dextrose in small amount for its chemical function on hemoglobin color.

Starch conversions are commonly carried out with small amounts of mineral acid at least for initiating the hydrolysis. Where no enzyme is used the extent of the hydrolysis is regulated by the time of reaction at controlled temperature and pressure. Then the acid is neutralized. During the reaction the starch is initially a colloid, being hot-water-dispersible as distinguished from being water-soluble in either hot or cold water. The large molecules of the starch are broken down by the hydrolysis to a mixture of smaller molecules, progressively until dextrose is the final product. A stage is reached where some starchy colloid material is present with some dextrose, then a stage where there is little to no starch and an increased amount of dextrin and dextrose including a large quantity of water-soluble crystalloid materials intermediate between the dextrins and dextrose. Then the hydrolysis proceeds to break down all the intermediate materials to dextrose as the end product. The sweetness of the hydrolysate increases as the dextrose increases and the hydrolysate more or less passes over to a sweet product, and the sweetness and bitterness rapidly increase, after the D. E. passes 55.

The present invention employs a conversion hydrolysate in which sweetness is not pronounced and in which substantially all the material is suitably constant in its water-binding powers over the range of temperatures used in processing meat products. The material dissolves readily and being largely non-colloidal its solution is stable with changes in temperature. The range of D. E. from 24 to 30 is in general a transition zone with variations according to details of procedure in conducting the hydrolysis. Because stability is important for temperature changes from cooking to refrigeration, the lower limit for the hydrolysate is D. E. of 24, preferably 30.

From a D. E. of 24 upwardly to a D. E. of 55, the hydrolysate may be described as relatively non-sweet. At D. E. of 55 the product has a limited sweetness, which, however, can be masked by the presence of salt in amount commonly used in meat products. Using an hydrolysate having D. E. of 55 in the amount of 13 parts of hydrolysate solids to 100 parts of meat with the conventional quantities of salt, does not impart objectionable sweetness to the composition. However, where sweetness is desired more than 13 parts of hydrolysate having a D. E. of 55 per 100 parts of meat may be used. The non-sweet content of the hydrolysate is effective as water-binding content and especially as the fat emulsifying agent. The dextrose and other reducing sugar content are effective with respect to the color of the hemoglobin, and especially of the nitroso-hemoglobin resulting from use of nitrite salt as a curing agent.

Because of the high water-binding power of the hydrolysate, there may be present in a meat product without disadvantageous softening, much more dextrose when it is a component of the hydrolysate, than when it is used as a single ingredient. For example, consider two bologna formulations having

| | |
|---|---|
| Beef | 50 lbs. |
| Fat trimmings | 50 lbs. |
| Sodium chloride | 2 lbs. |
| Curing salt (90% NaCl, 6% NaNO₂, 4% NaNO₃) | 0.25 lb. |
| Flavoring | as needed |
| Conditioner | A or B |

Where A is 0.5 lb. of corn sugar and B is 10 lbs. of starch hydrolysate of D. E. of 42, the B-formula has over eight times as much reducing sugar as the A-formula and over four times as much dextrose as the A-formula. The product of the B-formula is much redder and firmer than that of the A-formula. The dextrose alone in the A-formula tends to give softness to the product. But with over four times as much dextrose in the B-formula, the non-dextrose ingredients which accompany it exert a firming effect which overcomes the tendency to soften.

The following table gives the analysis of several acid-hydrolysates of corn starch in dry powder form as obtained in the open market as "dry syrup."

TABLE.—COMPOSITION

[In percent by weight]

| | Specimen | | | | |
|---|---|---|---|---|---|
| | No. 1 | No. 2 | No. 3 | No. 4 | No. 5 |
| D. E. | 24 | 30 | 42 | 4–43 | 55 |
| Moisture Content | 3.4 to 4.5 | 3.5 | 3.4 to 4.5 | 3.0 | 3 to 5 |
| Protein | .05 | .06 | .05 | .04 | .05 |
| Ash | .20 | .24 | .22 | .26 | .24 |
| Acidity as HCl | .012 | .010 | .012 | .012 | .009 |
| SO₂ | .004 | .004 | .004 | .002 | .004 |
| Dextrose | 7.96 | 11.1 | 22.03 | 20.78 | 34.90 |
| Maltose | 8.78 | 12.6 | 20.74 | 20.21 | 26.91 |
| Higher Sugars | 20.54 | 20.3 | 20.04 | 19.7 | 17.95 |
| Dextrins | 62.43 | 52.8 | 36.89 | 36.0 | 19.94 |
| pH | 5.0 | 5.0 | 5.0 | 4.8 to 5.2 | 5.5 |

In the table, the product having D. E. of 24 is very high in dextrins, at least some of which are close to starch, and are colloidal. Products having a D. E. of approximately 42 are preferred, as a happy medium between the extremes, as indicated by the analyses. Various procedures for cooking canned hams and other meats are known, as for example those set forth in my U. S. Patents Nos. 2,224,399, 2,305,479 and 2,305,480. The internal temperature attained by the meat is at least 160° F. in these processes.

In general in treating meats temperatures in the range from 90° to 110° F. are avoided, as this is an incubation range for microorganisms. Lower than this, salami may be dried at 80° F. Higher than this, safety is assured by a minimum temperature of 120° F. The higher the temperature, the more the tendency to purge water and fat, and hence the greater is the protection against purging offered by the present invention.

In preparing dry-syrup compound of the present invention, a small quantity of oleaginous material is compounded with it, thus to prevent dustiness and caking. But it is difficult to compound said two materials uniformly in a range of approximately .25 to 10 parts of the oleaginous material to 90 to 100 of dry syrup. To effect uniformity in compounding such materials, the oleaginous material is first distributed over a carrier of sodium chloride crystals in amount upwardly from about 2 parts of finely ground sodium chloride crystals to one part of oleaginous material. In compounding meats with starch hydrolysate as conditioner the practical range of use is from 1 to 13 pounds of hydrolysate to 100 pounds of meat (meaning lean and fat). Since there is also a practical upper limit for the content of sodium chloride in a ground meat product, the amount of sodium chloride in the compound of the present invention is predetermined within practical limits to avoid the possibility of excessive salt content in a final product and to provide sufficient crystal vehicle to enable compounding the dry syrup with the oleaginous agent.

These factors lead to a practical range for the essential components, expressed in parts by weight:

| | |
|---|---|
| Oleaginous material | .12 to 10 |
| Finely ground sodium chloride | .25 to 20 |
| Dry syrup | Balance to 100 |

Of course other ingredients may be present so long as they do not alter the general physical character of the material. In particular, seasoning ingredients may be present, such as ground spices, essential oils, oleo-resins of spices, and curing salt. By adding flavoring material, the dry-syrup compound may be produced in numerous compositions as many special formulas for particular products, such as frankfurters, bologna, salami, spiced canned meats and the like. However, it is more commercially desirable to omit, or to limit, a content of seasoning or spices, so that a more universally useful compounded ingredient is available to the meat-packing trade.

Among the oleaginous materials are the animal and vegetable fats and oils, such as corn oil, soya bean oil, lard, cotton seed oil, and various hydrogenated fats and oils.

Where oleaginous substance, for example corn oil, is subject on standing to a degree of oxidation leading to rancidification, the stability of a compound containing it is in this respect increased by including antioxidant material effective on fats and oils. Such material is commonly dispensed or distributed in an oil or fatty vehicle, and such a vehicle carrying it is preferably made a part at least of the oleaginous content for the present invention. Suitable antioxidant agents are set forth in the U. S. Hall Patents Re. 23,329, No. 2,511,802, No. 2,511,803, No. 2,511,804 and No. 2,518,233.

However, the preferred antioxidant material is lecithin, because it has in addition emulsifying properties for fats and oils. It thus supplements the emulsifying action of the non-dextrose content of the dry-syrup. A large number of the special encased and canned ground meat products contain a high percentage of fat which must be and remain well emulsified in a stable product.

Lecithin is available in commerce in a vehicle of soya bean oil, running by weight about 65% lecithin and 35% oil. Such a "lecithin compound" (hereinafter so referred to) alone or with other oleaginous agent may be well dispersed, with heat to liquify the oleaginous material if necessary, on fine flake salt crystals, for subsequent admixture with dry syrup.

The following is illustrative of the present invention:

EXAMPLE 1

Part A

| | Lbs. |
|---|---|
| Fine flake sodium chloride | 1100 |
| Corn oil | 25 |
| Lecithin compound | 150 |
| Paprika | 80 |
| Oil of pimento | 1 |

The ingredients are thoroughly compounded and then mixed as follows:

| | Lbs. |
|---|---|
| Part A | 15 |
| Dry syrup (D. E.=42) | 85 |

In terms of the essential components (considering the oil of pimento and all of the lecithin compound as parts of the oleaginous content) the compound contains:

| | Parts |
|---|---|
| Dry syrup | 85. |
| Oleaginous material | 1.95 |
| Sodium chloride | 12.2 |

It is of course to be understood that the ingredients and the quantity may be changed within the scope of the description herein set forth. Such changes and modifications will become apparent from the following examples of variable formulations for meat products made with dry syrup, which may be provided in a compound by the present invention.

In the following examples, the term "curing salt" signifies a composition as follows:

| | Percent |
|---|---|
| Sodium chloride | 90 |
| Sodium nitrite | 6 |
| Sodium nitrate | 4 |

EXAMPLE 2—BOLOGNA

| | |
|---|---|
| Beef | 25 lbs. |
| Snouts | 25 lbs. |
| Pork trimmings | 50 lbs. |
| Curing salt | 6 oz. |
| Dry soluble seasoning | 8 oz. |
| Ice | 15 lbs. |
| Sodium chloride | 2 lbs. |
| Dry syrup (D. E.=42) | 7 lbs. |

In the foregoing, part of the sodium chloride may be present as a component of the conditioning compound of the present invention. To provide all the sodium chloride for the above formula, a conditioner composition may be used as follows:

| | Lbs. |
|---|---|
| Sodium chloride | 2 |
| Oleaginous material | 1 |
| Dry syrup (D. E.=42) | 7 |

EXAMPLE 3—SAUSAGE

In Example 2, the "dry syrup" item may have a D. E. from 24 to 55, and the amount may vary from 1 to 13 pounds. When it is used in the amount of 13 pounds, in the form of a compounded conditioner of the present invention, in a manner to introduce all the salt, the salt content for the formula must be below the maximum limit. A suitable compound is:

| | Lbs. |
|---|---|
| Sodium chloride | 2 |
| Oleaginous material | 0.5 |
| Dry syrup (D. E.=55) | 13 |

The D. E. of the dry syrup may vary from 24 to 55, the range from 30 to 42 being preferred.

EXAMPLE 4—LOAF

| | |
|---|---|
| Chopped beef | 50 lbs. |
| Ground pork trimmings | 50 lbs. |
| Curing salt | 6 oz. |
| Seasoning | as needed |
| Sodium chloride | 3 lbs. |
| Dry syrup (D. E.=30) | 1 to 13 pounds |

The composition is mixed well in a mechanical mixer, then stuffed into a cellulose casing, pressed in a mold, and cooked in water or steam at 160° F. for 3½ hours for a 3½ inch diameter.

Where all the salt is to be added via the dry syrup compound, the following composition is suitable:

| | lbs. |
|---|---|
| Sodium chloride | 3 |
| Oleaginous material | 1.5 |
| Dry syrup (D. E.=30) | 10.5 |

It is to be understood that the D. E. of the dry syrup may be in the range from 24 to 55 and that the oleaginous content may be lessened within the scope of the present invention.

EXAMPLE 5—CANNED LUNCHEON MEAT

| | |
|---|---|
| Ground picnic | 100 lbs. |
| Curing salt | 6 oz. |
| Flavoring | as needed |
| Sodium chloride | 3 lbs. |
| Dry syrup (D. E.=24) | 1 to 13 lbs. |

The composition is well mixed in a mechanical mixer, sealed in cans, and cooked at 160° F. for 3½ hours.

The dry-syrup compound of Example 4 may be used to add all the needed salt and dry syrup. However, if the compound of Example 1 is used it will provide in parts by weight:

| | |
|---|---|
| Sodium chloride (12.2) | 0.143 or 1.97 |
| Oleaginous material (1.95) | .023 or 0.3 |
| Dry syrup (85) | 1.0 or 13.0 |

Using the same in the meat formula for the minimum and maximum amount of dry syrup, leaves a balance of sodium chloride to be added as such, in the approximate amounts of 2.86 pounds and 1 lb. respectively.

In the drier varieties of sausage products, such as salami, the amount of conditioner commonly employed for water-binding power, is relatively low in the practical range from 1 to 13 pounds per 100 pounds of meat, as follows:

EXAMPLE 6—B. C. SALAMI

| | |
|---|---|
| Lean beef | 75 lbs. |
| Back fat | 25 lbs. |
| Curing salt | 6 oz. |
| Sodium chloride | 3 lbs. |
| Dry syrup (D. E.=42) | 1 lb. |

In such a case, the amount of salt added by way of a dry-syrup compound of the present invention is not more than .2 lb. out of a total of 3 lbs. Where the salt content of the dry-syrup compound is well below the maximum, its presence may be practically neglected in this case. Yet, where the antioxidant is present, it functions in the meat product to minimize rancidity, even after exerting its antioxidant function in the dry-syrup compound as a prepared ingredient.

From the foregoing it is clear that various compositions may be made to provide dry-syrup conditioner as a stable formula ingredient in compounding many kinds of ground meat products. The disclosed variations, and others are contemplated as falling within the scope of the invention as defined by the following claims.

I claim:
1. A conditioner for ground meat products comprising in a homogeneous pulverulent mixture, a starch hydrolysate, oleaginous material and sodium chloride crystals, the hydrolysate being incomplete and having a D. E. in the range from 24 to 55, the composition having by weight oleaginous material from .12 to 10 parts, sodium chloride up to 20 parts, and hydrolysate in amount to balance to 100, the sodium chloride being present in amount at least twice the amount of the oleaginous material.

2. A conditioner for ground meat products comprising in a homogeneous pulverulent mixture, a starch hydrolysate, oleaginous material and sodium chloride crystals, the hydrolysate being incomplete and having a D. E. in the range from 30 to 42, the composition having by weight oleaginous material from .12 to 10 parts, sodium chloride up to 20 parts, and hydrolysate in amount to balance to 100, the sodium chloride being present in amount at least twice the amount of the oleaginous material.

3. A conditioner for ground meat products comprising in a homogeneous pulverulent mixture, a starch hydrolysate, oleaginous material lechithin, and sodium chloride crystals, the hydrolysate being incomplete and having a D. E. in the range from 24 to 55, the composition having by weight oleaginous material from .12 to 10 parts, sodium chloride from .25 to 20 parts, and hydrolysate in amount to balance to 100, the sodium chloride being present in amount at least twice the amount of the oleaginous material.

4. A conditioner for ground meat products comprising in a homogeneous pulverulent mixture, a starch hydrolysate, oleaginous material which is subject to oxidation on exposure to air, antioxidant material therefor, and sodium chloride crystals, the hydrolysate being incomplete and having a D. E. in the range from 24 to 55, the composition having by weight oleaginous material from .12 to 10 parts, sodium chloride from .25 to 20 parts, and hydrolysate in amount to balance to 100, the antioxidant material being soluble in the oleaginous material, and the sodium chloride being present in amount at least twice the amount of the oleaginous material.

5. A conditioner for ground meat products comprising in a homogeneous pulverulent mixture, a starch hydrolysate, oleaginous material which is subject to oxidation on exposure to air, lecithin in small quantity as antioxidant for said oleaginous material, and sodium chloride crystals, the hydrolysate being incomplete and having a D. E. in the range from 24 to 55, the composition having by weight oleaginous material from .12 to 10 parts, sodium chloride from .25 to 20 parts, and hydrolysate in amount to balance to 100, and the sodium chloride being present in amount at least twice the amount of the oleaginous material.

6. A conditioner for ground meat products comprising in a homogeneous pulverulent mixture, a starch hydrolysate, oleaginous material which is subject to oxidation on exposure to air, lecithin in small quantity as antioxidant for said oleaginous material, and sodium chloride crystals, the hydrolysate being incomplete and having a D. E. in the range from 30 to 42, the composition having by weight oleaginous material from .12 to 10 parts, sodium chloride from .25 to 20 parts, and hydrolysate in amount to balance to 100, and the sodium chloride being present in amount at least twice the amount of the oleaginous material.

7. A conditioner for ground meat products comprising in a homogeneous pulverulent mixture, a starch hydrolysate, vegetable oil, antioxidant material therefor, and sodium chloride crystals, the hydrolysate being incomplete and having a D. E. in the range from 24 to 55, the composition having by weight vegetable oil from .12 to 10 parts, sodium chloride from .25 to 20 parts, and hydrolysate in amount to balance to 100, the antioxidant material being soluble in the vegetable oil, and the sodium chloride being present in amount at least twice the amount of the vegetable oil.

8. A conditioner for ground meat products comprising in a homogeneous pulverulent mixture, a starch hydrolysate, vegetable oil, antioxidant material therefor, and sodium chloride crystals, the hydrolysate being incomplete and having a D. E. in the range from 30 to 42, the composition having by weight vegetable oil from .12 to 10 parts, sodium chloride from .25 to 20 parts, and hydrolysate in amount to balance to 100, the antioxidant material being soluble in the vegetable oil, and the sodium chloride being present in amount at least twice the amount of the vegetable oil.

9. A conditioner for ground meat products comprising in a homogeneous pulverulent mixture, a starch hydrolysate, vegetable oil, lecithin as antioxidant therefor, and sodium chloride crystals, the hydrolysate being incomplete and having a D. E. in the range from 24 to 55, the composition having by weight vegetable oil from .12 to 10 parts, sodium chloride from .25 to 20 parts, and hydrolysate in amount to balance to 100, and the sodium chloride being present in amount at least twice the amount of the oleaginous material.

10. A conditioner for ground meat products comprising in a homogeneous pulverulent mixture, a starch hydrolysate, vegetable oil, lecithin as antioxidant therefor, and sodium chloride crystals, the hydrolysate being incomplete and having a D. E. in the range from 30 to 42, the composition having by weight vegetable oil from .12 to 10 parts, sodium chloride from .25 to 20 parts, and hydrolysate in amount to balance to 100, and the sodium chloride being present in amount at least twice the amount of the oleaginous material.

11. A conditioner for ground meat products comprising in a homogeneous pulverulent mixture, a starch hydrolysate, oleaginous material and sodium chloride crystals, the hydrolysate being incomplete and having a D. E. in the range from 24 to 55, and the sodium chloride being present in amount at least twice the amount of the oleaginous material.

12. The method of preparing a meat conditioner which comprises mixing edible oleaginous material with at least twice its weight of fine crystals of sodium chloride, and mixing the resulting mass uniformly with dry syrup in proportion to form a mass having by weight in respect to said three ingredients from .12 to 10 parts of oleaginous material, from .25 to 20 parts of sodium chloride, and dry syrup in quantity to balance to 100, said dry syrup being an incomplete hydrolysate of starch having a D. E. in the range from 24 to 55.

13. The method of preparing a meat conditioner which comprises mixing edible oleaginous material containing antioxidant material for fats and oils with at least twice its weight of fine crystals of sodium chloride, and mixing the resulting mass uniformly with dry syrup in proportion to form a mass having by weight in respect to said three ingredients from .12 to 10 parts of oleaginous material, from .25 to 20 parts of sodium chloride, and dry syrup in quantity to balance to 100, said dry syrup being an incomplete hydrolysate of starch having a D. E. in the range from 24 to 55.

14. The method of preparing a meat conditioner which comprises mixing edible oleaginous material subject to oxidation on exposure to air and containing antioxidant material therefor with at least twice its weight of fine crystals of sodium chloride, and mixing the resulting mass uniformly with dry syrup in proportion to form a mass having by weight in respect to said three ingredients from .12 to 10 parts of oleaginous material, from .25 to 20 parts of sodium chloride, and dry syrup in quantity to balance to 100, said dry syrup being an incomplete hydrolysate of starch having a D. E. in the range from 24 to 55.

15. The method of preparing a meat conditioner which comprises mixing edible oleaginous material subject to oxidation on exposure to air and containing lecithin as antioxidant therefor with at least twice its weight of fine crystals of sodium chloride, and mixing the resulting mass uniformly with dry syrup in proportion to form a mass having by weight in respect to said three ingredients from .12 to 10 parts of oleaginous material, from .25 to 20 parts of sodium chloride, and dry syrup in quantity to balance to 100, said dry syrup being an incomplete hydrolysate of starch having a D. E. in the range from 24 to 55.

16. The method of preparing a meat conditioner which comprises mixing edible vegetable oil subject to oxidation on exposure to air and containing antioxidant material therefor with at least twice its weight of fine crystals of sodium chloride, and mixing the resulting mass uniformly with dry syrup in proportion to form a mass having by weight in respect to said three ingredients from .12 to 10 parts of oleaginous material, from .25 to 20 parts of sodium chloride, and dry syrup in quantity to balance to 100, said dry syrup being an incomplete hydrolysate of starch having a D. E. in the range from 24 to 55.

17. The method of preparing a meat conditioner which comprises mixing edible vegetable oil subject to oxidation on exposure to air and containing lecithin as antioxidant therefor, with at least twice its weight of fine crystals of sodium chloride, and mixing the resulting mass uniformly with dry syrup in proportion to form a mass having by weight in respect to said three ingredients from .12 to 10 parts of oleaginous material, from .25 to 20 parts of sodium chloride, and dry syrup in quantity to balance to 100, said dry syrup being an incomplete hydrolysate of starch having a D. E. in the range from 24 to 55.

18. The method of preparing a meat conditioner which comprises mixing edible oleaginous material with at least twice its weight of fine crystals of sodium chloride, and mixing the resulting mass uniformly with dry syrup, said dry syrup being an incomplete hydrolysate of starch having a D. E. in the range from 24 to 55.

19. The method of preparing a meat conditioner which comprises mixing edible oleaginous material containing lecithin with at least twice its weight of fine crystals of sodium chloride, and mixing the resulting mass uniformly with dry syrup, said dry syrup being an incomplete hydrolysate of starch having a D. E. in the range from 24 to 55.

20. The method of preparing a meat conditioner which comprises mixing edible vegetable oil containing lecithin with at least twice its weight of fine crystals of sodium chloride, and mixing the resulting mass uniformly with dry syrup, said dry syrup being an incomplete hydrolysate of starch having a D. E. in the range from 24 to 55.

STEPHAN L. KOMARIK.

REFERENCES CITED

The following references are of record in the file of this patent:

UNITED STATES PATENTS

| Number | Name | Date |
|---|---|---|
| 2,147,261 | Lewis | Feb. 14, 1939 |
| 2,201,609 | Dale et al. | May 21, 1940 |
| 2,210,659 | Fetzer | Aug. 6, 1940 |
| 2,346,232 | Piret et al. | Apr. 11, 1944 |
| 2,355,548 | Musher | Aug. 8, 1944 |
| 2,410,264 | Brock et al. | Oct. 29, 1946 |